United States Patent [19]

Weisenbarger et al.

[11] Patent Number: 4,543,186
[45] Date of Patent: Sep. 24, 1985

[54] APPARATUS AND METHOD FOR THE TREATMENT OF WELL WATER THEREWITH

[76] Inventors: Gale M. Weisenbarger, 140 Woodland Dr., Eaton, Ohio 45320; John C. Moran, 3124 Lake Ave., Fort Wayne, Ind. 46805

[21] Appl. No.: 618,816

[22] Filed: Jun. 8, 1984

[51] Int. Cl.$^4$ ............................................... C02B 1/23
[52] U.S. Cl. .................................. 210/221.2; 210/222
[58] Field of Search .................... 210/222, 223, 198.1, 210/220, 221.1, 221.2

[56] References Cited

U.S. PATENT DOCUMENTS

| | | | |
|---|---|---|---|
| 4,157,963 | 6/1979 | Jessop et al. | 210/222 |
| 4,229,389 | 10/1980 | Granger | 210/223 |
| 4,242,200 | 12/1980 | Dubourg | 210/222 |
| 4,367,143 | 1/1983 | Carpenter | 210/222 |
| 4,485,012 | 11/1984 | Ehresmann | 210/222 |

Primary Examiner—John Adee
Attorney, Agent, or Firm—Louis E. Hay

[57] ABSTRACT

An apparatus and method of treating well water, in a water system, by polarizing and aerating a small portion of pumped water from the high pressure side of the water system and returning the treated water to the raw water in the well.

2 Claims, 7 Drawing Figures

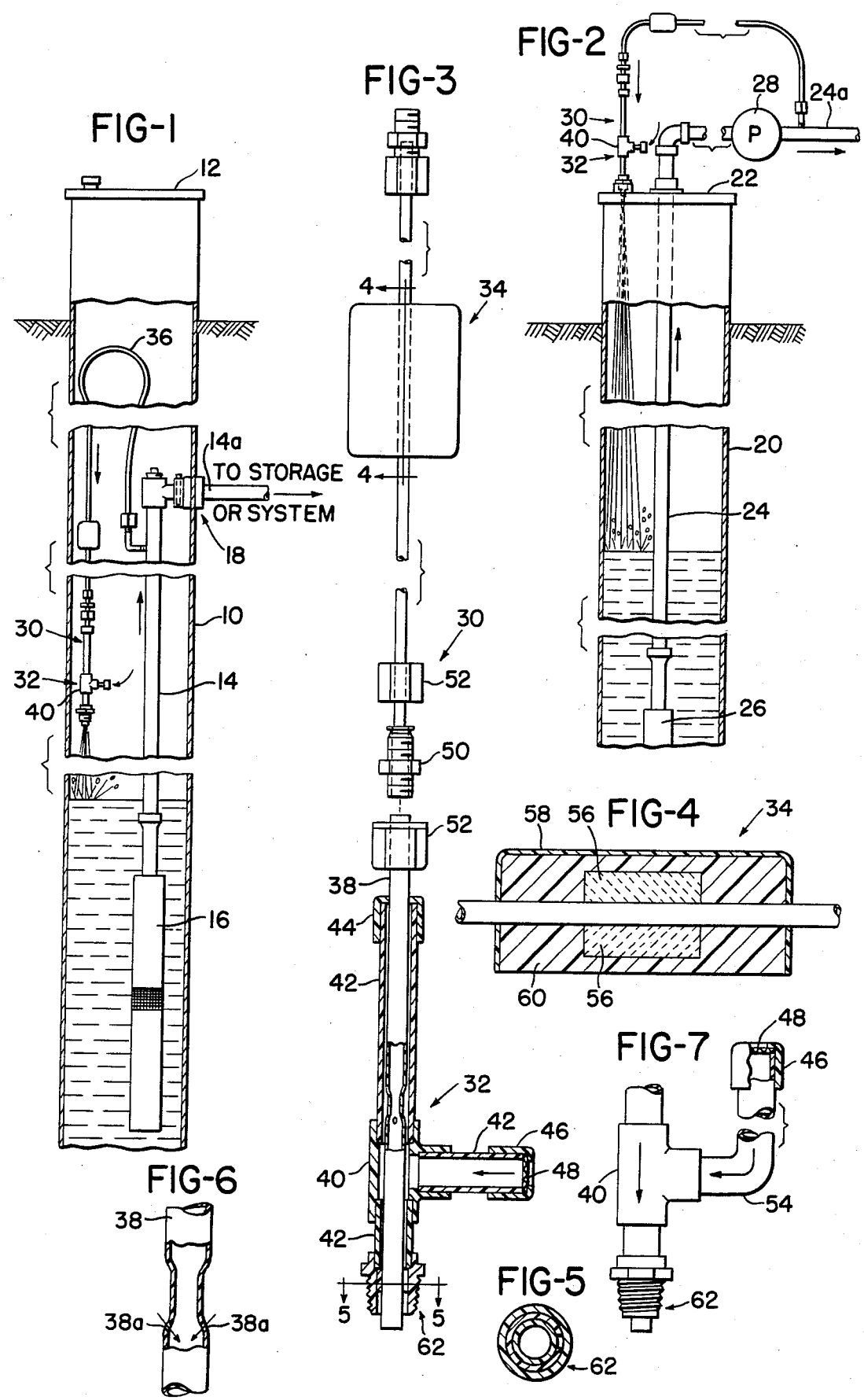

APPARATUS AND METHOD FOR THE TREATMENT OF WELL WATER THEREWITH

Reference to related U.S. Pat. No. 3,649,532 Method of Treating Water—McLean.

Reference to related U.S. patent application Ser. No. 600,845 filed Apr. 16, 1984, Magnetic and Method Device For Abating the Adherence of Precipitates in Fluid Transmitting Conduits Therewith—John C. Moran et al.

BACKGROUND OF THE INVENTION

All subterranean water contains mineral and other chemical substances and compounds which are soluble in the water. Most, if not all, of these substances are introduced in the water, which started as rain or snow, as the water flows in natural underground channels.

The problem with water which flows from, or which is pumped from wells in the ground, is to remove the undesirable elements which are in solution. While the undesirable compounds are in solution, they cannot be reduced or removed by a filtration process. There are only two methods by which the undesirable compounds may be removed. The most common method, especially in large water systems such as municipal water systems, is by chemical treatment in combination with filtration. A second method, of which the referenced U.S. patent is an example, is by a combination of aeration and filtration. The object of the latter method is to convert the undesirable compounds which are in unfilterable solution into either precipitates or colloids which may be removed by subsequent filtration.

For purpose of illustration only, two of the more common objectionable soluble compounds in well water are compounds containing sulphur and iron. Although the presence of such compounds may not be visible in the water, the sulphur compounds produce a most objectionable odor and taste, and the iron compounds produce the severe discoloration which is often observed on fixtures such as sinks, bath tubs, and in the water tanks on toilets.

Ferrous carbonate, $FeCO_3$, is soluble in carbon dioxide and forms ferrous hydrogen carbonate, $Fe(HCO_3)_2$, which is contained in many ground waters. On contact with air, carbon dioxide is lost and oxidation takes place, precipitating the iron as hydrated ferric oxide. In addition to staining fixtures, the hydrated ferric oxide will also form scale in pipes, and will provide a suitable environment for the growth of Crenothrix and other iron-oxidizing bacteria. The purificiation of such iron bearing water may be effected by suitable aeration and filtration.

One apparatus and method for the aeration and filtration of well water is disclosed in the referenced U.S. patent. the necessary equipment is not unreasonable for large commerical installations where it will be serviced on a regular basis by qualified operating personnel; however, it is too cumbersome and expensive for individual home use such as the household of a farmer, or a suburban family which is not on a public water system in which the water is treated at a central station.

SUMMARY OF THE INVENTION

The present invention provides a simple apparatus and method for the treatment of well water on an individual basis, regardless of the size of the well. The apparatus and method employed by the teachings of the referenced U.S. patent requires a specially constructed storage tank which is substantially larger and much more expensive than a comparable conventional tank, and also requires substantial additional plumbing and regular periodic servicing. The referenced U.S. patent provides teachings of an aeration system which operates intermittently, and which has no effect on the water in the well.

An installation using the apparatus and method of the present invention uses a conventional storage tank and also conventional plumbing. Whereas in the referenced patent, the aeration takes place in the special storage tank and affects only the water in the tank, the apparatus of the present invention is installed in the well casing itself, and is a continuously acting process which has a beneficial effect on the water in the well before the water is pumped from the well.

The apparatus and method, constituting the present invention, continuously draws a small quantity of water from the high pressure side of the system, polarizes the water with a magnetic unit, and then aerates this by-pass water and returns the aerated by-pass water to the surface of the water in the well. The principal advantage of this treatment method is that, over a period of time, the composition of the water in the well is beneficially altered, which in turn has a beneficial effect on the pumps, pipes, and other components comprising the water system.

The aforementioned treatment creates a colloidal suspension of the hydrated ferric oxide and hardness salts. When the water also contains oxygen absorbed during the aeration process, and is returned to the well, the colloidal particles act as seed crystals bringing about the oxydation and precipitation of the dissolved iron throughout the body of water in the well casing and gradually spreads into the aquifer. A graphic analogy to the spread of the precipitation can be seen in the diffusion of a drop of food coloring dropped into a jar of water. After the precipitation has occured, the precipitates may be filtered from the water prior to consumption.

The treatment of the present invention is not limited to soluble compounds containing iron, but is also effective for the removal of hydrogen sulfide, soluble compounds containing manganese, and other compounds in the water. The effectiveness of the apparatus is enhanced by surrounding a portion of the tube carrying the feedback of by-pass water to the aerator assembly with a magnetic polarization unit which will be described below.

BRIEF DESCRIPTION OF THE DRAWINGS

FIG. 1 is a schematic illustration of the apparatus, constituting the invention, installed in a well using a submersible pump;

FIG. 2 is a schematic illustration of the apparatus, constituting the invention, installed in a well using an external pump;

FIG. 3 is an enlarged schematic illustration, partially in cross-section, and depicting the principal components of the apparatus;

FIG. 4 is a cross-section taken on line 4—4 of FIG. 3 and depicting one form of the magnetic polarization unit;

FIG. 5 is a cross-section taken on line 5—5 of FIG. 3;

FIG. 6 is an enlarged detail of one form of a venturi tube; and,

FIG. 7 is an illustration of an alternate screened air inlet for use within a well casing.

DESCRIPTION OF THE PREFERRED EMBODIMENT

The manner of constructing wells and pumping water therefrom involves many variables, for which reason there is no standard installation. For example, a shallow well can use a suction pump as illustrated in FIG. 2; whereas a deep well will require a submersible pump as illustrated in FIG. 1. Also, in warmer climates where ambient conditions permit, the water from the well may be carried in exposed pipes, whereas in colder climates the pipes must be buried below the freeze line. There are also additional variables, as for example, some installations will use iron pipe with threaded joints as water transmitting conduits, while other installations will use copper tubing with soldered joints. Some codes also permit the use of plastic pipes. Because of the many possible variables, the well installations depicted in FIGS. 1 and 2 are to be regarded merely as being representative of the many possible installations as practiced in the well art.

Specific reference is made to FIG. 1 which illustrates a deep well installation having a casing 10, the lower end of which extends into the well water, and with the upper end extending above ground level where it is provided with a cover 12. The lower end of pipe 14 has attached thereto a conventional submersible pump 16 which is suspended into the water and which, when electrically energized, pumps water into pipe 14. It is normal to provide the casing with a pitless adapter 18 which is mounted through an aperture in the casing. Pitless adapters are well known in the art, and, since they have a vertically sliding connection inside the casing, they provide a convenient connection which permits the pump to be pulled from the well for servicing or repair when necessary. A pipe 14a screws into the pitless adapter from the outside and carries the water to a storage tank of conventional design as used in water systems. Pressure switches, electrical wiring, gauges and other additional components necessary to operate the water system are well known in the art, for which reason they require no further description.

Reference is now made to FIG. 2 which illustrates a typical shallow well installation having a casing 20, the lower end of which extends into the well water, and with the upper end extending above ground level where it is provided with a cover 22. The lower end of pipe 24 has attached thereto a conventional screen filter 26. The pipe 24 extends through the cover 12 and is attached to the inlet side of a pump 28 which pumps water from the well and transmits it to a conventional storage tank through a high pressure pipe 24a. As in FIG. 1, all ancillary equipment, which is well known, has been omitted from FIG. 2.

Reduced to its basic components, the apparatus constituting the present invention consists of a feedback means for by-passing or returning a portion of the water from the high pressure side of the water system to the well, with means for magnetically acting on, or polarizing the by-pass water, and also with means for aerating the by-pass water before returning it to the unpumped water in the well.

Whereas the method of treating water in the referenced U.S. patent acts only intermittently on water being pumped from a well into the storage tank, applicants' apparatus and treatment method is to continuously treat a small portion of the pumped water and return it to the well. Applicants' method of treatment will, over a period of time, improve the character of the raw water in the well and in the aquifer.

Whereas in the treatment method employed by the referenced U.S. patent, there is no improvement in the quality of the raw water in the well, and the treatment is applied only to the water pumped from the well, the applicants' treatment method is applied to the water being by-passed from the high pressure side of the water system, the principal objective being to improve the raw well water itself, which will in turn decrease the frequency for replacing or servicing the filters used in the water system and also prolong the service life of the pump, valves and pipes of the system.

Applicants' apparatus will vary in the specific pipe and/or tubing fittings used, as dictated by the particular well installation; however, all fittings are readily available at plumbing supply and most hardware retailers. Applicants' preference is to use plastic fittings because such fittings will not corrode in an environment containing corrosive compounds such as are contained in much raw water and in the ambient environment within the well casing above the water level.

FIG. 1 depicts an installation in which the apparatus of the present invention is within the well casing, and FIG. 2 depicts an installation in which the apparatus is mounted externally. FIG. 3 is an enlarged exploded depiction of one combination of elements forming the apparatus of the present invention.

As its principal elements, the apparatus 30 has an aerator assembly 32, a magnetic unit 34, and a by-pass tube 36 which passes through the magnetic unit and connects the aerator assembly to the high pressure side of the water system.

The aerator assembly 32 contains a venturi tube 38 which may be made, for example, from a length of Lexan plastic tubing. The venturi portion itself may be formed by elevating the temperature of a small length of the tube a sufficient amount to permit it to elongate with a reduction in diameter at the heated portion when the tube is stretched. FIG. 6, which is an enlarged portion of the tube, illustrates the venturi in the cross-sectioned portion of the tube. After the venturi is formed, a plurality of small apertures 38a are formed in the general downstream area indicated by the arrows in FIG. 6.

Within the scope of the invention, other materials and methods may be used for forming the venturi tube. For example, the tube may be formed of copper or aluminum with the reduced diameter of the venturi formed by the rolling process. The applicants' preference for the depicted application on a water system is to form the venturi tube from rigid plastic tubing of ⅜ inch (9.53 mm) outside diameter by the above-described method of forming the venturi section; standard CPVS rigid plastic pipe and fittings of ½ inch (12.70 mm) inside diameter, such as used on plumbing installations, for the housing of the aerator assembly; and flexible ¼ inch (6.35 mm) outside diameter tubing for the by-pass tube.

The principal requirements for the aerator assembly housing are that the housing supports the venturi tube; that the housing have a cavity surrounding the venturi section and portions of the adjacent upstream and downstream portions of the tube; and, with the open ends of the tube extending from the housing.

The aerator assembly housing may be formed of a standard tee 40, to which suitable lengths of pipe 42 are affixed by any one of several adhesives sold at all plumbing supply and hardware stores for such purpose. The open end of the upstream pipe or tube 42 is closed by means of a standard cap 44 having an aperture formed in the end thereof for passage of the venturi tube 38 as illustrated in FIG. 3. Another standard cap 46, having an aperture formed in the end thereof, retains a wire mesh screen 48 as depicted in FIG. 3. The upper end of the venturi tube 38 and the lower end of the by-pass tube 36 may be joined in any convenient manner. Applicants found the most convenient method was to use standard compression fittings having a central portion 50 with male threads on each end and compression nuts 52. The venturi tube should be longitudinally retained in desired position with a sealant which will also prevent passage of air between the tube and cap 44. The fittings at the lower end of the venturi tube 38 and at the upper end of the by-pass tube 36 will be dependent on the particular installation, for which reason they are not further described. A variation of the aerator assembly is depicted in FIG. 7 in which a horizontal tube 42 in FIG. 3 is replaced with a 90 degree elbow 54.

Within the scope of the present invention, as described and claimed, the word "tube" is used in the generic dictionary sense as being a hollow cylinder to convey liquids and gases. By using the tubing sizes stated above, it is noted that there is a cavity within the housing which surrounds the venturi section of the venturi tube, and that there is an open lateral passage in communication with the cavity surrounding the venturi tube.

As depicted at the bottom of FIG. 3, a compression fitting 62, having a male pipe thread useful for installation in the cover 12 of FIG. 2, is used to retain the lower end of the venturi tube in leak-proof relationship with the inside of adjacent tube 42.

During operation, as the water flowing in the by-pass tube 36 has its pressure reduced when flowing through the throat of the venturi tube 38, ambient air is aspirated through the screen 48 and passes through the apertures 38a and aerates the water. The scientific reasons why a venturi operates are well known in the mechanical and hydraullic arts, for which reason no further explanation is required.

In the referenced pending patent application, a single elongated permanent bar magnet is potted in a dielectric housing, and the magnetic units, so formed, are used in pairs by externally mounting them on a fluid transmitting conduit. In the magnetic unit of the present invention, two elongated bar magnets are potted in a single dielectric housing with the by-pass tube 36 passing through the housing and being longitudinally positioned to be between and parallel with the two magnets.

Specific reference is now made to FIG. 4 which is an enlarged cross-section of th novel magnetic unit 34. The two elongated permanent bar magnets 56 are potted in an elongated dielectric housing 58 by means of conventional petroleum base potting material 60 which is well known in the art. The by-pass tube 36 extends through the magnetic unit in substantially the position depicted in FIGS. 3 and 4. If the tube is passed through the necessary apertures in the housing before the potting material is poured, the potting material will bond onto the tube and prevent the magnetic unit from moving on the tube.

A magnetic unit in accordance with the present invention may be used for other applications where it is desired to produce a polarizing effect on particles in a fluid. For example, the magnetic units may be made with threaded pipe nipples or short lengths of copper tubing for installation on water heaters and evaporative coolers. This would produce a permanent installation of the magnetic unit as opposed to strapping two magnetic units to the outside of a conduit in accordance with the referenced patent application.

Within the scope of the invention, a shut-off valve may be added between the inlet end of the by-pass tube and the high pressure side of the water system to control the rate of flow in the by-pass tube, and to inactivate the by-pass apparatus for servicing without inactivating the entire water system.

It is recommended that the aerated water be discharged at a substantial distance above the surface of the water in the well.

It is to be understood that the embodiments of the present invention as shown and described are to be regarded merely as illustrative, and that the invention is susceptible to variations, modifications and changes, without regard to construction methods, within the scope of the appended claims.

We claim:

1. An apparatus for the treatment of raw well water in a water system having a pump for pumping water from the well and discharging the pumped water at above atmospheric pressure, said apparatus comprising:
   (a) an aerator assembly comprising:
      (a-1) a vertical venturi tube having a venturi section with an open upstream and an open downstream tube portion extending therefrom, and with the downstream portion of said venturi section having at least one aperture therethrough, and,
      (a-2) a housing supporting said venturi tube and having a cavity therein surrounding the venturi section and a portion of the upstream and downstream portions of the tube extending from said venturi section, and further having an open lateral passage in communication with the cavity surrounding said venturi tube, the upstream and downstream ends of said venturi tube extending from said housing;
   (b) a magnetic unit having at least two elongated permanent bar magnets potted in a dielectric housing; and,
   (c) a by-pass tube passing between the bar magnets in said magnetic unit and connecting the upstream end of said venturi tube to the water in the discharge side of the pump in said water system, the water flowing through said by-pass tube being subjected to polarization by said magnetic unit and aerated as it flows through the venturi section of said venturi tube by ambient air being aspirated through the lateral passage in said housing and entering the flowing water through the apertures in the downstream portion of said venturi section of said venturi tube, the aerated water flowing from the downstream end of said venturi tube and discharging into the water in the well.

2. An aerator assembly adapted for joining to the end of a fluid discharging conduit for aerating the fluid being discharged, said aerator assembly comprising:
   (a) a venturi tube having a venturi section with an open upstream and an open downstream tube portion extending therefrom, and with the downstream portion of said venturi section having at least one aperture therethrough, and with the open upstream end of said venturi tube being adapted for attaching to the discharge end of said fluid discharging conduit; and, (b) a housing supporting said venturi tube and having a cavity therein surrounding the venturi section and adjacent upstream and downstream portions of said venturi tube, the upstream and downstream open ends of said venturi tube extending from said housing, and further having an open lateral passage in communication with the cavity surrounding said venturi tube, the fluid flowing through said venturi tube being aerated as it flows through the venturi section of said venturi tube by ambient air being aspirated through the lateral passage in said housing and entering the fluid through the apertures in the downstream portion of the venturi section of said venturi tube, the aerated fluid discharging from the open downstream end of said venturi tube.

* * * * *